United States Patent
Heiman et al.

(10) Patent No.: US 10,903,900 B2
(45) Date of Patent: Jan. 26, 2021

(54) NON-GEOSYNCHRONOUS ORBIT SATELLITE CONSTELLATIONS

(71) Applicant: Gilat Satellite Networks Ltd., Petah Tikva (IL)

(72) Inventors: Rafi Heiman, Ramot Hashavim (IL); Ivan Tsonev Ivanov, Sofia (BG)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

(21) Appl. No.: 16/424,793

(22) Filed: May 29, 2019

(65) Prior Publication Data

US 2020/0036437 A1  Jan. 30, 2020

Related U.S. Application Data

(60) Provisional application No. 62/703,460, filed on Jul. 26, 2018.

(51) Int. Cl.
*H04B 7/19* (2006.01)
*H04B 7/195* (2006.01)
*H04B 17/40* (2015.01)
*H04B 7/185* (2006.01)

(52) U.S. Cl.
CPC ......... *H04B 7/195* (2013.01); *H04B 7/18541* (2013.01); *H04B 17/40* (2015.01)

(58) Field of Classification Search
CPC ..... H04B 7/195; H04B 17/40; H04B 7/18541
See application file for complete search history.

(56) References Cited

U.S. PATENT DOCUMENTS

| | | | | |
|---|---|---|---|---|
| 2001/0045494 A1* | 11/2001 | Higgins | ............. | H04B 7/18513 244/158.4 |
| 2003/0025041 A1* | 2/2003 | Higgins | ................ | B64G 1/242 244/158.4 |
| 2004/0211864 A1* | 10/2004 | Less | ........................ | H04B 7/195 244/158.4 |
| 2016/0149599 A1* | 5/2016 | Lindsay | .............. | H04W 72/046 455/13.1 |
| 2018/0343055 A1* | 11/2018 | Olson | ................ | H04B 7/18523 |
| 2018/0376393 A1* | 12/2018 | Wu | ........................ | H04W 36/18 |
| 2020/0036437 A1* | 1/2020 | Heiman | ............. | H04B 7/18541 |

* cited by examiner

*Primary Examiner* — Md K Talukder

(74) *Attorney, Agent, or Firm* — Banner & Witcoff, Ltd.

(57) ABSTRACT

A method for designing Non-Geosynchronous Orbit (NGSO) satellite constellations and NGSO satellite constellations thereof are presented. An NGSO satellite constellation may be designed to allow an earth station to perform handover between two satellites of the NGSO satellite constellation while the two satellites appear to be at about a same location in the sky relative to the earth station. In such constellation, an earth station may perform such handover between the two satellites in a Make-Before-Break fashion while the earth station may be configured to use a single, slow-tracking antenna, such as a mechanically tracking dish antenna.

18 Claims, 7 Drawing Sheets

NON-GEOSYNCHRONOUS ORBIT SATELLITE CONSTELLATIONS

This application claims priority to U.S. Patent Application Ser. No. 62/703,460, filed Jul. 26, 2018, entitled "Non-Geosynchronous Orbit Satellite Constellations," the disclosure of which is incorporated by reference in its entirety and made part hereof.

FIELD OF THE INVENTION

Aspects of the disclosure pertain to the field of satellite communications in general, to Non-Geosynchronous Orbit (NGSO) satellite constellations, and to methods for their design.

BACKGROUND

Communication satellites may be characterized in accordance with the orbits in which they circle the earth. In general, a satellite may be characterized as having either a Geosynchronous Orbit (GSO) or a non-Geosynchronous Orbit (NGSO). NGSO satellites may be further characterized as having Low Earth Orbit (LEO) or Medium Earth Orbit (MEO).

Use of NGSO satellite constellations may have some advantages compared to use of GSO communication satellites or GSO satellite constellations. However, one disadvantage of NGSO satellites is the non-fixed directional pointing required of an earth station antenna, even for a small aperture terminal. Relatively slow tracking is needed to keep the earth station antenna pointing at the satellite while the satellite moves across the sky relative to the earth station. Much faster steering is needed for performing a handover, i.e. for moving the communication link from one satellite to another. Such fast steering is usually achieved by electronically steered antennas (ESA), which are usually quite expensive. Alternatively, handovers could be supported by using two mechanical antennas (e.g. dish antennas), yet such solutions could be as expensive or undesired for other reasons.

For some applications, a handover between satellites has to be performed in a Make-Before-Break (MBB) fashion, i.e., the communication link over the next satellite has to be established before releasing the communication link over the currently used satellite. To achieve handovers in MBB fashion, the earth station may need to use two antennas, e.g. for simultaneously tracking both satellites during the handover period.

Yet, there may be several advantages to using a relatively simple, mechanically tracking dish antenna compared to using either an electronically steered antenna (ESA) or two tracking antennas. A single mechanically tracking dish antenna may be associated with lower cost, simplicity, and practically constant performance (e.g. gain, beam width) independent of elevation and skew angle.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

Aspects of the disclosure may be directed to at least one NGSO satellite constellation that may be configured to allow at least one earth station, the at least one earth station comprising a slow-tracking antenna, to perform one or more handovers in MBB fashion. In some embodiments, the slow-tracking antenna of the at least one earth station may be a mechanically steered dish antenna. The NGSO constellation may be configured using geometry and timing specifications to guarantee that two relevant satellites may be at approximately a same location in the sky, as seen from the at least one earth station, at a time the at least one earth station may be performing a handover. Thus, the at least one NGSO satellite constellation may be configured to support handovers (in MBB fashion) without antenna re-pointing.

Aspects of the disclosure may be directed to a first type of NGSO satellite constellations that may be configured to support handovers without antenna re-pointing through back-and-forth (continuous) tracking of an earth station's antenna. A NGSO satellite constellation of the first type may comprise a plurality of satellites that may be configured to circle the Earth in the equatorial plane, e.g., at about a same altitude above the earth surface. Some satellites of the plurality of satellites may be configured to fly in the east direction (e.g., flying at an inclination angle of 0 degrees), while the remaining satellites of the plurality of satellites may be configured to fly in the west direction (e.g., flying at an inclination angle of 180 degrees). At least one earth station may be configured to track an east-flying satellite and to switch to a west-flying satellite when the east-flying satellite and the west-flying satellite pass each other, e.g. seem to be at about a same position in the sky as seen from the at least one earth station. In a similar manner, the at least one earth station may be configured to track the west-flying satellite and switch to an east-flying satellite when the west-flying satellite and the east-flying satellite pass each other. This back-and-forth tracking pattern may be repeated several times. To compensate for the Earth rotation eastwise, occasionally a handover from an east-flying satellite to a west-flying satellite that pass each other may not take place. On such occasions, a handover may occur when the next west-flying satellite passes the east-flying satellite.

Aspects of the disclosure may be directed to a second type of NGSO satellite constellations that may be configured to support handovers without antenna re-pointing through (continuous) tracking of an earth station's antenna along two-dimensional spherical shapes. A NGSO satellite constellation of the second type may comprise a plurality of satellites configured to circle the Earth along a multiplicity of orbits, e.g. of a same altitude above the earth surface, wherein a number of satellites of the plurality of satellites may circle the Earth along each orbit of the plurality of orbits. The multiplicity of orbits may be associated with two inclination angles, wherein each orbit of the multiplicity of orbits may be associated with one of the two inclination angles. In some embodiments, the sum of the two inclination angles may be about 180 degrees. For example, some orbits of the multiplicity of orbits may be associated with an inclination angle of $\beta$ degrees, and the remaining orbits of the multiplicity of orbits may be associated with an inclination angle of about $180-\beta$ degrees (e.g., retrograde inclination). In some embodiments, an NGSO satellite constellation of the second type may be configured with an inclination angle in the range of 30 to 60 degrees, for at least the purpose of supporting coverage for most of the highly populated areas on Earth. Each orbit of the multiplicity of orbits may intersect with the equatorial plane at two crossing points, denoted herein as the ascending node of the orbit and the descending node of the orbit, based on the direction the satellites associated with the orbit fly at when passing through the crossing points, e.g. ascending when flying north and descending when flying south.

In some embodiments, an earth station, configured to communicate using a NGSO satellite constellation of the second type, may be configured to track satellites of the NGSO satellite constellation of the second type in a kite-shaped pattern. For example, the earth station may be configured to:

Track a first satellite of the plurality of satellites, the first satellite may be flying at about a north-west direction along a first orbit of the multiplicity of orbits, the first orbit having an inclination angle of about 180–β degrees;

Switch to track a second satellite of the plurality of satellites, the second satellite may be flying at about a north-east direction along a second orbit of the multiplicity of orbits, the second orbit having an inclination angle of β degrees;

Switch to track a third satellite of the plurality of satellites, the third satellite may be flying at about a south-east direction along a third orbit of the multiplicity of orbits, the third orbit having an inclination angle of β degrees and an ascending node at about an opposite longitude (e.g., at about 180 degrees difference) compared to the ascending node associated with the second orbit; and Switch to track a fourth satellite of the plurality of satellites, the fourth satellite may be flying at about a south-west direction along a fourth orbit of the multiplicity of orbits, the fourth orbit having an inclination angle of about 180–β degrees and an ascending node at about an opposite longitude compared to the ascending node associated with the first orbit.

In reference to the above example, the tracking segment of the first orbit, the tracking segment of the second orbit, the tracking segment of the third orbit and the tracking segment of the fourth orbit may be regarded as a kite-shaped tracking pattern. In some embodiments, the earth station may be configured to repeat the kite-shaped tracking pattern one or more times, wherein different sets of four (4) satellites associated with the same four orbits, respectively, may be used in different repetitions of the kite-shaped tracking pattern. In some embodiments, to compensate for the Earth rotation east-wise, the kite-shaped tracking pattern may be repeated using satellites associated with the same four orbits until a transition to a second kite-shaped tracking pattern over a different set of four orbits may be needed, wherein the second kite-shaped tracking pattern may be located east of the first kite-shaped tracking pattern.

BRIEF DESCRIPTION OF THE DRAWINGS

Figure 1:
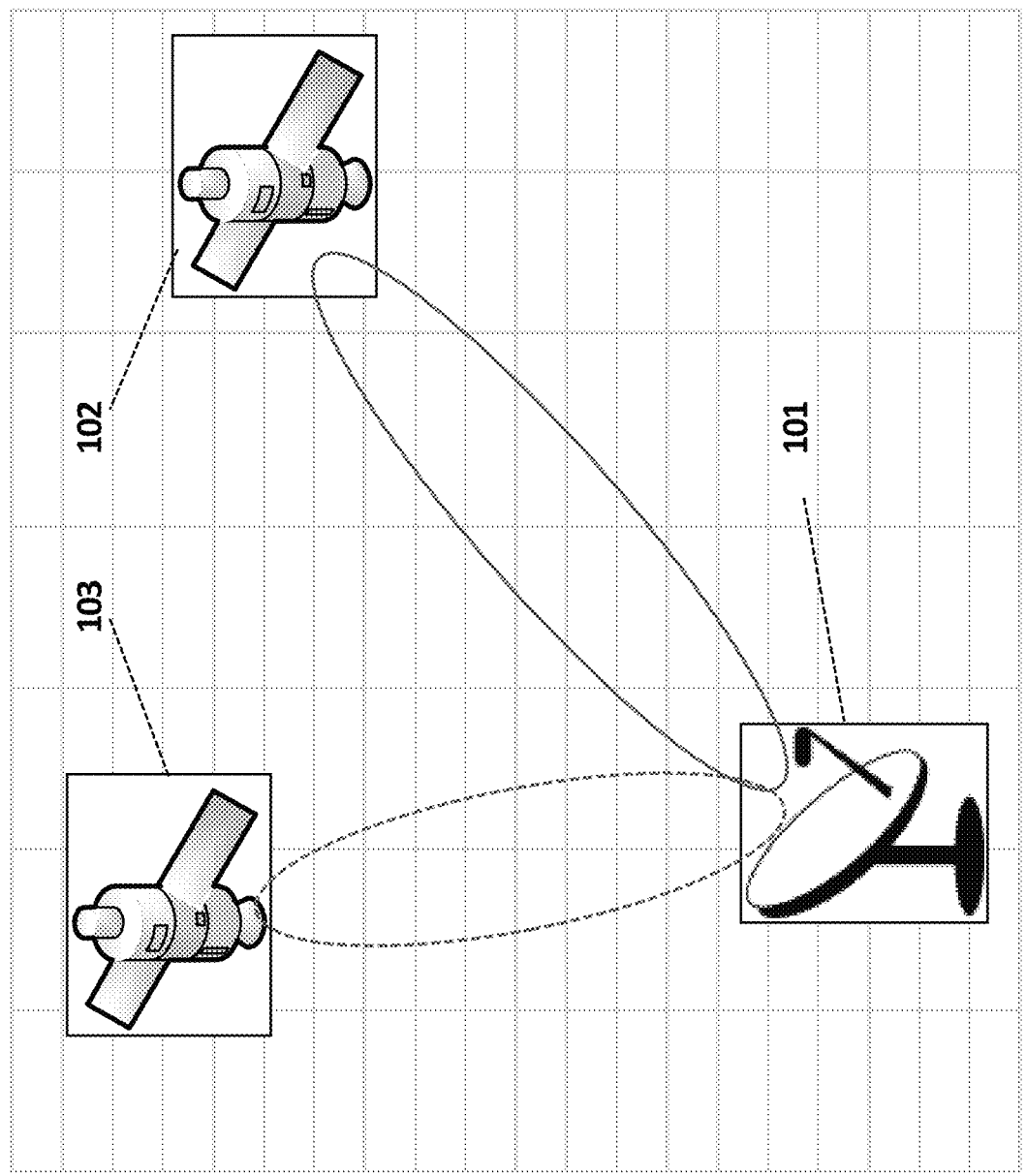

Having thus described the disclosure in general terms, reference will now be made to the accompanying drawings, which are not necessarily drawn to scale, and wherein:

FIG. 1 shows a satellite communication system in accordance with known art.

Figure 2:
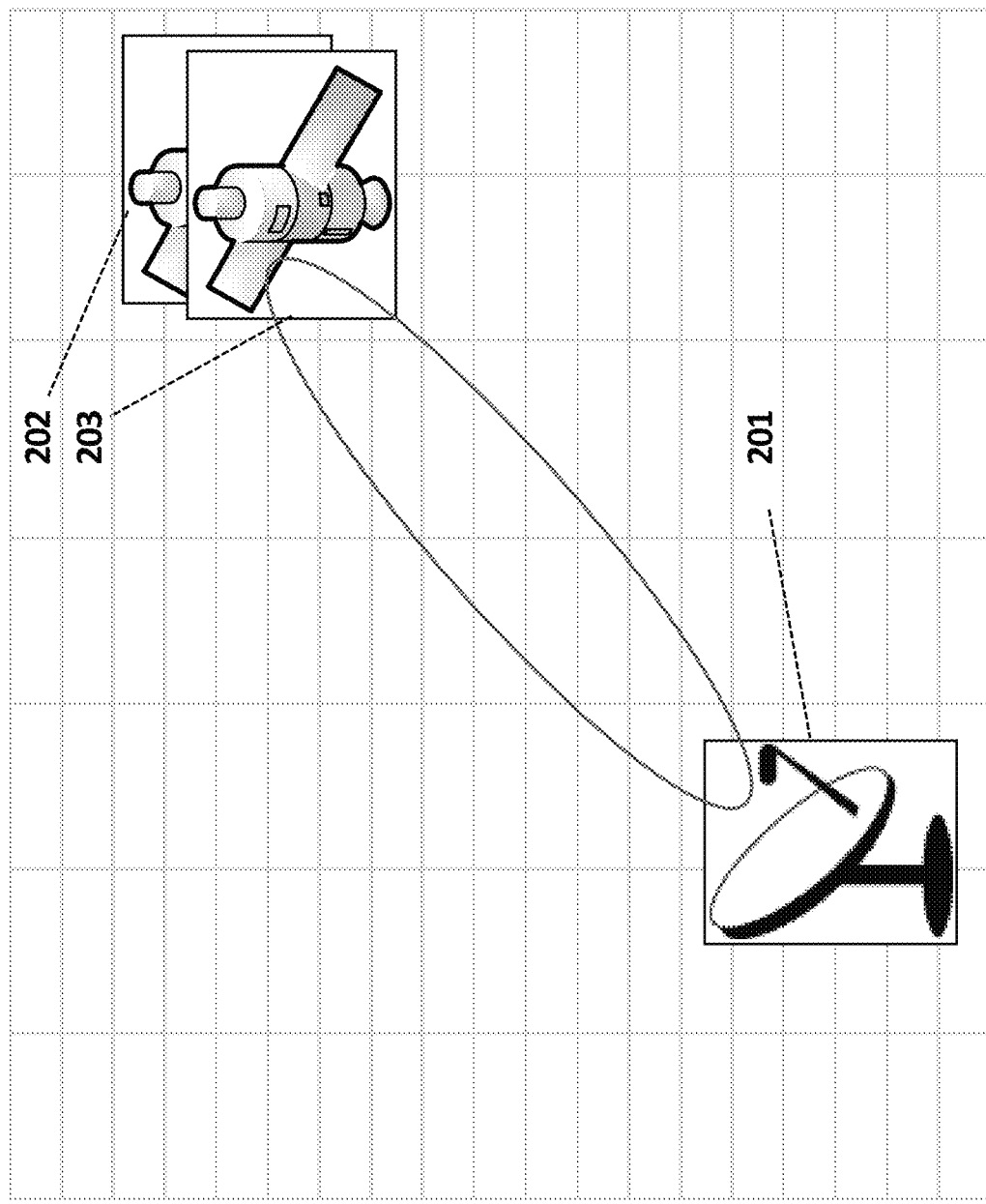

FIG. 2 shows a satellite communication system in accordance with aspects of the disclosure.

Figure 3:
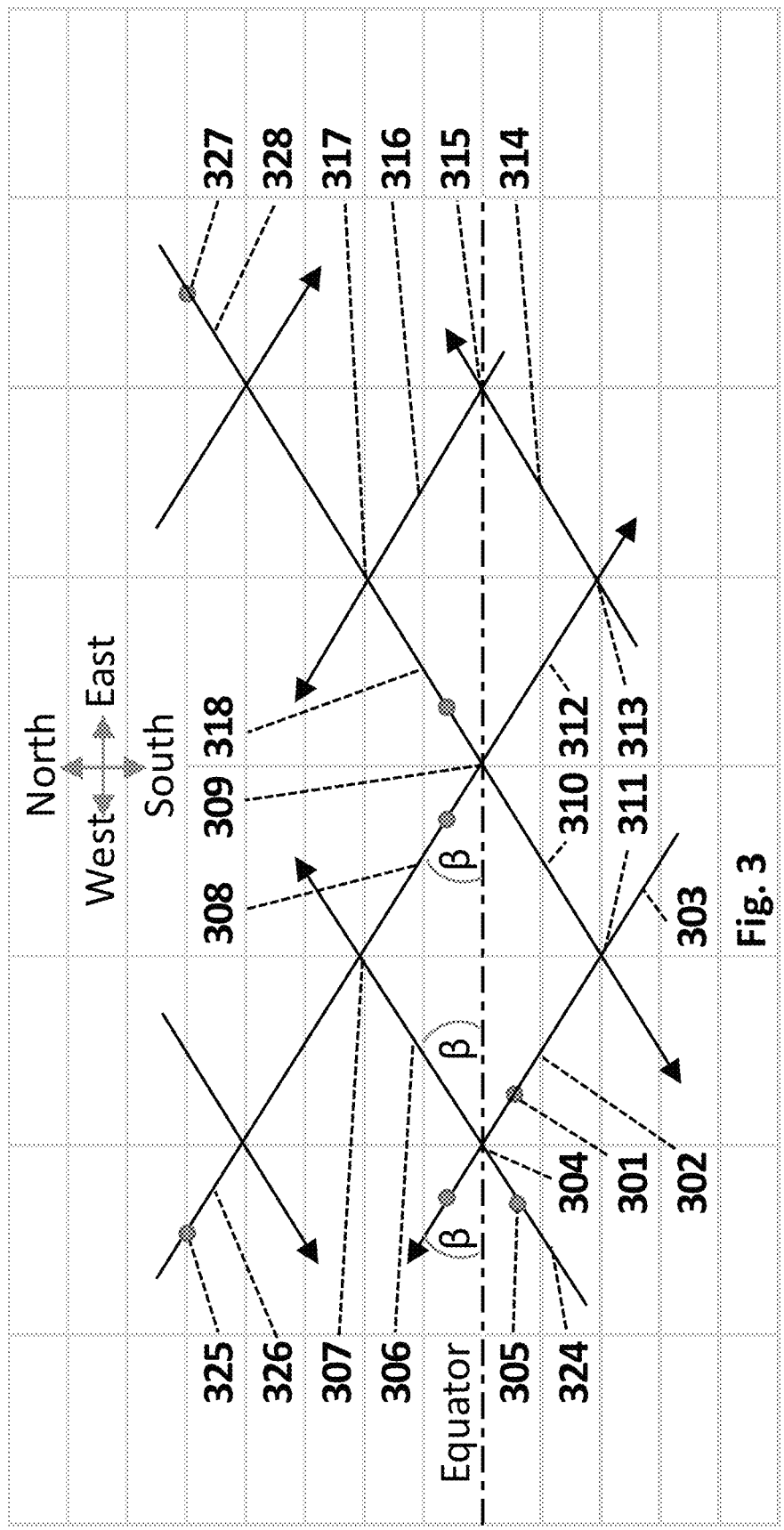

FIG. 3 shows a satellite-tracking pattern in accordance with aspects of the disclosure.

Figure 4:
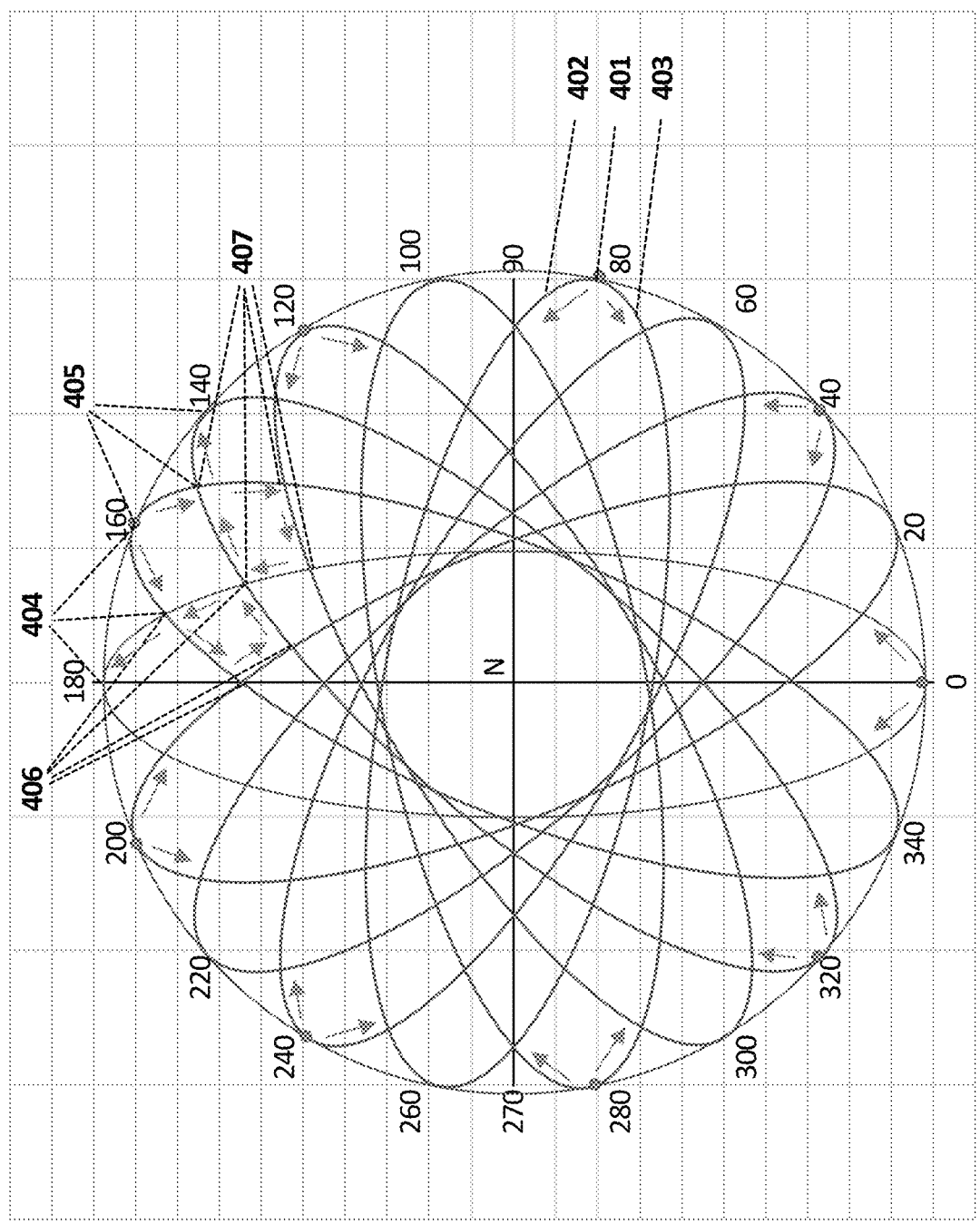

FIG. 4 shows a satellite constellation in accordance with aspects of the disclosure.

Figure 5:
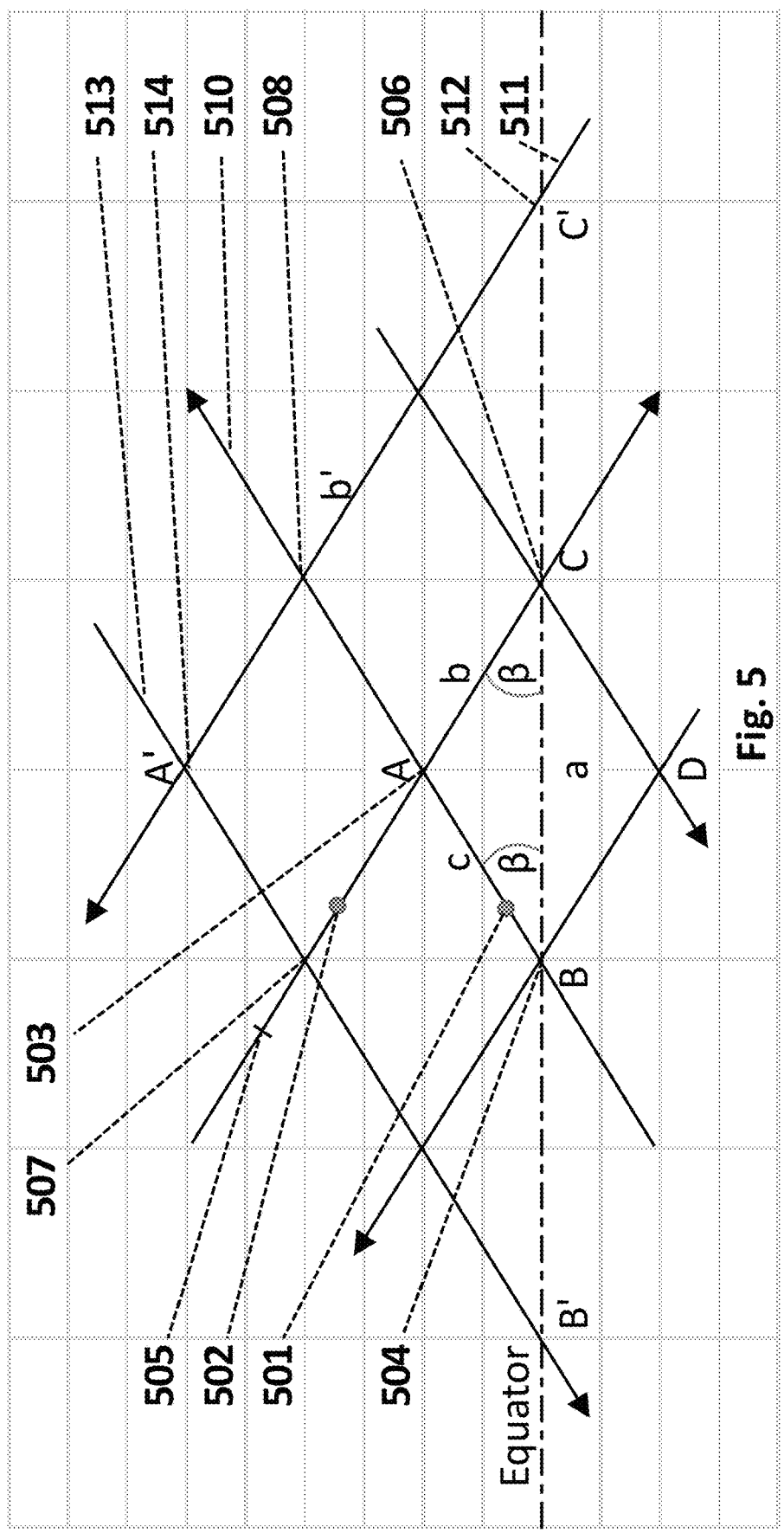

FIG. 5 shows a satellite-tracking pattern in accordance with aspects of the disclosure.

Figure 6:
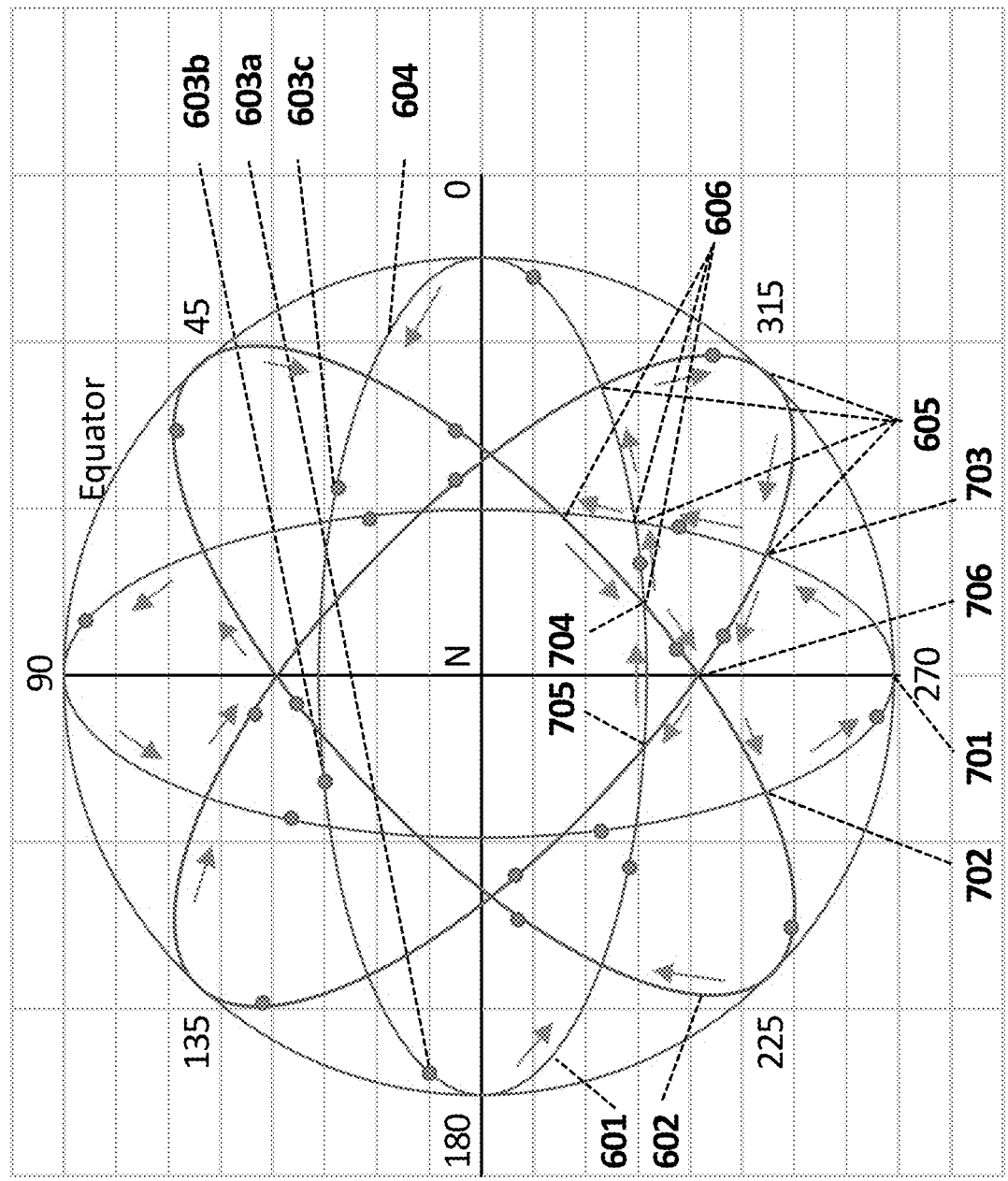

FIG. 6 shows a satellite constellation in accordance with aspects of the disclosure.

Figure 7:
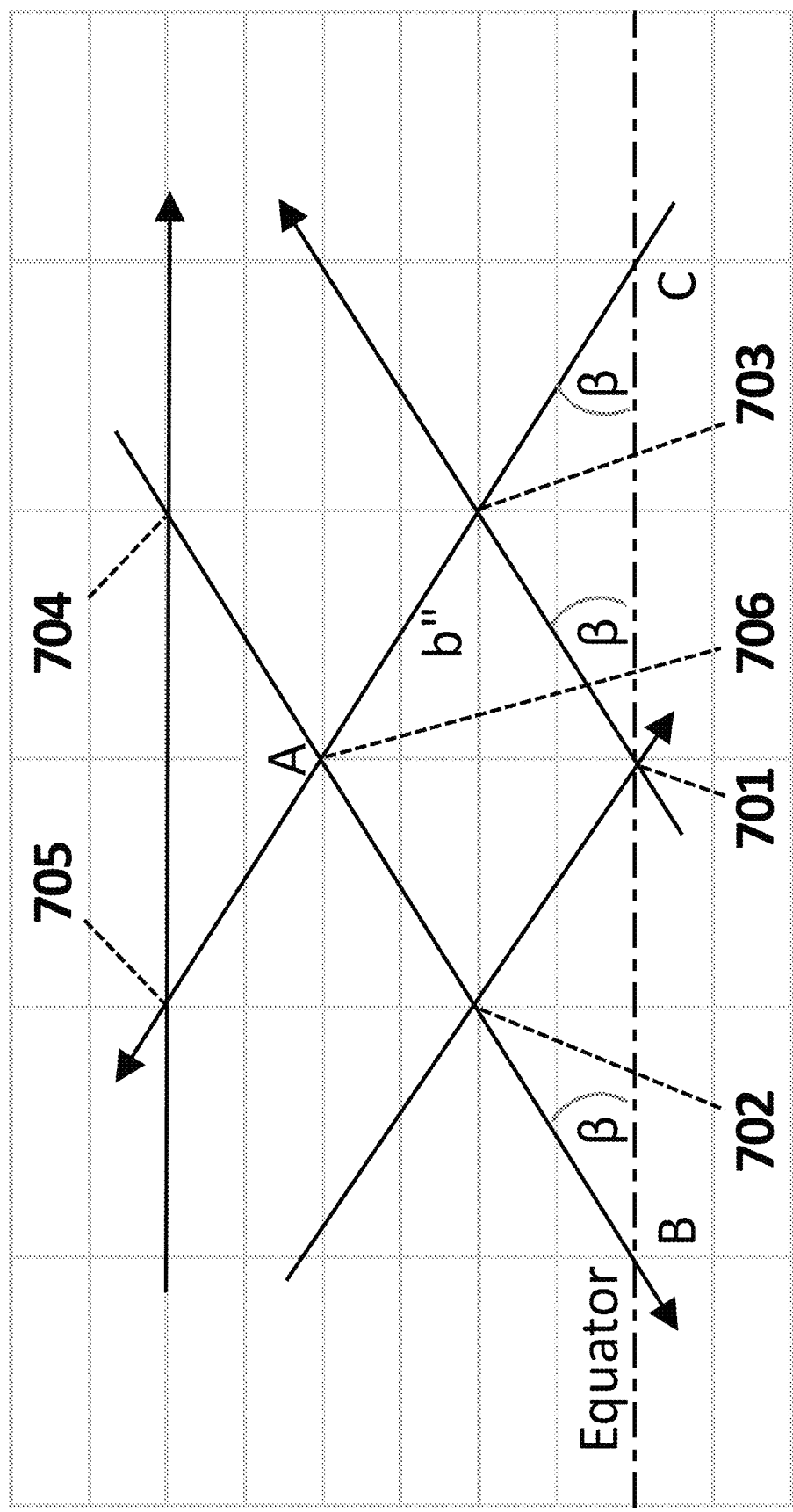

FIG. 7 shows a satellite-tracking pattern in accordance with aspects of the disclosure.

DETAILED DESCRIPTION

FIG. 1 shows a satellite communication system in accordance with known art. An earth station 101 may be configured to communicate using an NGSO satellite constellation comprising at least satellite 102 and satellite 103. While using the NGSO satellite constellation of FIG. 1, earth station 101 may need to re-point its antenna upon moving its communication link between satellites, e.g. upon performing a handover. For example, during a handover, earth station 101 may need to redirect (re-point) its antenna from pointing towards satellite 102 to pointing towards satellite 103, e.g. since satellite 103 may not be "visible" to the antenna of earth station 101 while the antenna points towards satellite 102. In some embodiments, earth station 101 may comprise two antennas, for example in order to support handovers between satellites in a Make-Before-Break (MBB) fashion.

FIG. 2 shows a satellite communication system in accordance with aspects of the disclosure. An earth station 201 may be configured to communicate using a NGSO satellite constellation comprising at least satellite 202 and satellite 203. While using the NGSO satellite constellation of FIG. 2, earth station 201 may perform a handover (i.e., moving its communication link) between satellites without re-pointing its antenna. For example, during a handover from satellite 202 to satellite 203, satellite 202 and satellite 203 may be viewed by earth station 201 roughly at the same direction, allowing the earth station to use a single antenna for simultaneously communicating over both satellites. During handover, both satellite 202 and satellite 203 may be well within the main beam lobe of the earth station 201 single antenna, allowing earth station 201 to perform a handover in MBB fashion using its single antenna.

FIG. 3 shows a schematic example of two kite-shaped patterns that may be associated with a NGSO satellite constellation (e.g., such as the NGSO satellite constellation of FIG. 2). The NGSO satellite constellation may be configured to support handovers at the four corners of each of the kite-shaped tracking patterns with no need for re-pointing of an earth station antenna.

Referring to FIG. 3, satellite 301 may be configured to fly in about a north-west (NW) direction along orbit 303, wherein orbit 303 may be in an inclination angle of about 180–β degrees and comprise NW edge 302 of the kite-shaped tracking pattern. In a similar manner, satellite 305 may be configured to fly in about a north-east (NE) direction along orbit 324, wherein orbit 324 may be in an inclination angle of about β degrees and comprise NE edge 306 of the kite-shaped tracking pattern. As shown in FIG. 3, orbit 303 and orbit 324 may be seen as intersecting at about handover point 304. In a similar manner, satellite 325 may be configured to fly in about a south-east (SE) direction along orbit 326, wherein orbit 326 may be in an inclination angle of about β degrees and comprise SE edge 308 of the kite-shaped tracking pattern. As shown in FIG. 3, orbit 324 and orbit 326 may be seen as intersecting at about handover point 307. In a similar manner, satellite 327 may be configured to fly in about a south-west (SW) direction along orbit 328, wherein orbit 328 may be in an inclination angle of about 180–β degrees and comprise SW edge 310 of the kite-shaped tracking pattern. As shown in FIG. 3, orbit 326 and orbit 328 may be seen as intersecting at about handover point 309, and orbit 328 and orbit 303 may be seen as intersecting at about handover point 311.

In some embodiments, an earth station (e.g., such as earth station 201) may be configured to track satellites of the NGSO satellite constellation illustrated in FIG. 3 using a single antenna.

The earth station may be configured to track satellite 301 along NW edge 302 until satellite 301 arrives at about handover point 304. The NGSO satellite constellation may be configured so that satellite 301 and satellite 305 may be at about handover point 304 at about a same time, thus allowing the earth station (e.g., using its single antenna) to perform handover from satellite 301 to satellite 305, e.g., in a MBB fashion.

The earth station may be configured, after performing a handover at about handover point 304, to track satellite 305 along NE edge 306 until satellite 305 arrives at about handover point 307. The NGSO satellite constellation may be configured so that satellite 305 and satellite 325 may be at about handover point 307 at about a same time, thus allowing the earth station (e.g., using its single antenna) to perform handover from satellite 305 to satellite 325, e.g., in a MBB fashion.

The earth station may be configured, after performing a handover at about handover point 307, to track satellite 325 along SE edge 308, until satellite 325 arrives at about handover point 309. The NGSO satellite constellation may be configured so that satellite 325 and satellite 327 may be at about handover point 309 at about a same time, thus allowing the earth station (e.g., using its single antenna) to perform handover from satellite 325 to satellite 327, e.g., in a MBB fashion.

The earth station may be configured, after performing a handover at about handover point 309, to track satellite 327 along SW edge 310 until satellite 327 arrives at about handover point 311. The NGSO satellite constellation may be configured so that satellite 327 and another satellite, that may be configured to fly along orbit 303, may be at about handover point 311 at about a same time, thus allowing the earth station (e.g., using its single antenna) to perform handover from satellite 327 to the another satellite, e.g., in a MBB fashion.

The earth station may be configured, after performing a handover at about handover point 311 to track the another satellite along NW edge 302, as described above, and to perform handovers to further satellites flying along orbits 324, 326, 328 and 303 as described above. The above-described kite-shaped tracking pattern that includes four handovers in each cycle (e.g. a handover at each corner of the spherical kite), may be repeated (e.g., by the earth station) several times (several cycles). In each cycle, a different set of satellites may be flying along the set of orbits (e.g., 303, 324, 326 and 328) associated with the first kite-shaped tracking pattern comprising NW edge 302, NE edge 306, SE edge 308 and SW edge 310. It may be noted that viewed from a point in space above the NGSO satellite constellation, the first kite-shaped tracking pattern may look as rotating clock-wise.

Due to the Earth rotation relative to the NGSO satellite constellation in the east direction, the earth station may be configured, after performing one or more tracking cycles along the first kite-shaped tracking pattern, to switch its tracking to a next kite-shaped tracking pattern, wherein the next kite-shaped tracking pattern may be located to the east of the first kite-shaped tracking pattern. For example, as shown in FIG. 3, the next kite-shaped tracking pattern may comprise SE edge 312, NE edge 314, NW edge 316 and SW edge 318. In some embodiments, the earth station may be configured to switch to the next kite-shaped tracking pattern by tracking a satellite that may be flying along SE edge 308 (of the first kite-shaped tracking pattern) past handover point 309 and onto SE edge 312 (of the next kite-shaped tracking pattern), e.g., without performing handover at about handover point 309. The earth station, after switching to the next kite-shaped tracking pattern, may be configured to track satellites along the edges of the next kite-shaped tracking pattern and through its handover points in a similar manner as previously described for the first kite-shaped tracking pattern. For example, the earth station may be configured to track a satellite along SE edge 312, perform handover at about handover point 313, track a satellite along NE edge 314, perform handover at about handover point 315, track a satellite along NW edge 316, perform handover at about handover point 317, track a satellite along SW edge 318, and perform handover at about handover point 309, e.g., to complete a tracking cycle in accordance with the next kite-shaped tracking pattern. Tracking satellites in accordance with the next kite-shaped tracking pattern may too be repeated several times. It may be noted that viewed from a point in space above the NGSO satellite constellation, the next kite-shaped tracking pattern may look as rotating anti-clock-wise.

Further due to the Earth rotation relative to the NGSO satellite constellation in the east direction, the earth station may be configured, after performing one or more tracking cycles in accordance with the next kite-shaped tracking pattern, to switch its tracking to yet another kite-shaped tracking pattern, wherein the another kite-shaped tracking pattern may be located to the east of the next kite-shaped tracking pattern. In some embodiments, the earth station may be configured to switch between the kite-shaped tracking patterns using a method similar to the one previously described (e.g., by skipping a handover and tracking a satellite from the next kite-shaped tracking pattern to the another kite-shaped tracking pattern). The earth station may be configured to repeatedly perform the above-described switches, e.g., from one kite-shaped tracking pattern to a following kite-shaped tracking pattern east to the one kite-shaped tracking pattern, e.g., for as long as the earth station may be tracking satellites of the NGSO satellite constellation. With each switch to a following kite-shaped tracking pattern, the tracking direction (e.g. as it may be viewed from a point in space above the NGSO satellite constellation) may be reversed, e.g. from clock-wise to anti-clock-wise, or from anti-clock-wise to clock-wise. By switching between kite-shaped tracking patterns, the earth station may traverse its tracking through different kite-shaped tracking patterns along the NGSO satellite constellation sphere during one stellar day (the time it takes the Earth to rotate itself relative to a distant star). This traversing of a whole circle of (spherical) kite-shaped tracking patterns may repeat itself every stellar day.

FIG. 4 shows a schematic example of a satellite constellation (e.g., such as the NGSO satellite constellation of FIG. 2) in accordance with aspects of the disclosure. The satellite constellation may be depicted as it may be viewed from above the Earth's North Pole (denoted as N), with longitude indications around the equator and with four (4) longitude lines connecting the North Pole (N) to the equator at longitudes 0, 90, 180 and 270 degrees. For illustrative reasons, the constellation may be presented as if it has zero altitude, e.g., the projection of the orbits on Earth may be presented.

Further referring to FIG. 4, in some embodiments the satellite constellation may comprise eighteen orbits (n=18), wherein FIG. 4 may depict the northern part of each orbit of the 18 orbits. In some embodiments, all orbits may be of a same altitude above the earth surface. In some embodiments, the number of orbits in the satellite constellation may be an integer multiple of 18. In some embodiments, the satellite constellation may comprise twenty-five satellites (s=25) per orbit, wherein FIG. 4 may depict only some of the satellites, e.g., only satellites at ascending nodes may be shown. In some embodiments, the number of satellites per orbit may be an integer multiple of 25. The 18 orbits of the satellite constellation may be arranged in pairs. Each pair of orbits may be configured to have a common ascending node, for example, the common ascending node associated with satellite 401. It may be noted that satellite 401 may actually represent two satellites, one from each orbit of the pair of orbits sharing the common ascending node. The nine (9) ascending nodes that may be associated with the 18 orbits may be equally spaced around the equator, e.g., 40 degrees apart of each other (as 360/9=40). In some embodiments, each pair of orbits may comprise a first orbit having an inclination angle of about 57.16 degrees (e.g., orbit 402) and a second orbit (e.g., orbit 403) having an inclination angle of about 122.84 degrees (as 180−57.16=122.84). For each orbit of the 18 orbits, the 25 satellites associated with an orbit may be equally spaced along the orbit. In addition, the satellite constellation may be configured with a relative initial phasing of 0 degrees, e.g., the satellite constellation may be configured to have a satellite from each of the 18 orbits at the respective ascending nodes of the orbits at about the same time, for example as shown in the FIG. 4.

In some embodiments, the satellite constellation may be configured to support handovers without antenna re-pointing, as previously described. Furthermore, the satellite constellation may be configured to support handovers without antenna re-pointing for earth stations that may be located at a wide range of latitudes. Earth stations that may be located at low latitudes, e.g., roughly up to ±15 or ±20 degrees, may follow a first circle of 18 kite-shaped tracking patterns along the equator, as previously described in reference to FIG. 3. Earth stations that may be located at higher latitudes, e.g., roughly between ±15 or ±20 degrees and ±40 or ±50 degrees may follow two second circles of 18 kite-shaped tracking patterns, a northern second circle and a southern second circle. The northern second circle of kite-shaped tracking patterns may be north of the first circle of kite-shaped tracking patterns, e.g., over the northern hemisphere, and the southern second circle of kite-shaped tracking patterns may be south of the first circle of kite-shaped tracking patterns, e.g., over the southern hemisphere. The northern second circle of kite-shaped tracking patterns and the southern second circle of kite-shaped tracking patterns may be symmetric (e.g., relative to the equator), supporting earth stations at symmetric latitudes and comprising symmetric handover points.

The handover points of the satellite constellation may be denoted in the format of (Longitude, Latitude) for regular handover points, or in the format of (Longitude, Latitude)* for handover points in which no handover may occur upon switching to a next kite-shaped tracking pattern. It may be noted that handover points associated with negative latitudes, e.g., being on the Earth's southern hemisphere, may not be shown in FIG. 4, as FIG. 4 may show only the northern part of the satellite constellation. For the first circle of kite-shaped tracking patterns (e.g., covering the equator), the handover points may be located, for example, at about (40L,0), (40L+10,15), (40L+20,0)*, and (40L+10,−15) for clock-wise tracked kite-shaped tracking patterns (e.g., as may be viewed from above the satellite constellation), and at about (40L,0)*, (40L−10,15), (40L−20,0), and (40L−10,−15) for anti-clock-wise tracked kite-shaped tracking patterns. In the above example, L may be an integer number between 0 and 8 (e.g. corresponding to the 9 ascending nodes). For example, for L=4, the clock-wise tracked kite-shaped tracking pattern 404 may comprise handover points at about (160,0), (170,15), (180,0)* and (170,−15), and the anti-clock-wise tracked kite-shaped tracking pattern 405 may comprise handover points at about (160,0)*, (150,15), (140,0) and (150,−15). Due to the Earth rotation to the east, an earth station may be configured to switch from kite-shaped tracking pattern 405 to kite-shaped tracking pattern 404 by performing no handover at (160,0)*, and instead continue tracking a same satellite as it may travel from (150,−15) through (160,0)* to (170, 15).

In a further example, for the northern second circle of kite-shaped tracking patterns, the handover points may be at about (40L,28), (40L+10,15), (40L+20,28)*, and (40L+10, 38) for anti-clock-wise tracked kite-shaped tracking patterns, and at about (40L,28)*, (40L−10,15), (40L−20,28), and (40L−10,38) for clock-wise tracked kite-shaped tracking patterns. For example, for L=4, the anti-clock-wise tracked kite-shaped tracking pattern 406 may comprise handover points at about (160,28), (170,15), (180,28)*, and (170,38), and the clock-wise tracked kite-shaped tracking pattern 407 may comprise handover points at about (160, 28)*, (150,15), (140,28), and (150,38). Due to the Earth rotation to the east, an earth station may be configured to switch from kite-shaped tracking pattern 407 to kite-shaped tracking pattern 406 by performing no handover at (160,28)*, and instead continue tracking a same satellite while it may travel from (150,38) through (160,28)* to (170, 15).

The satellite constellation may be configured to enable an earth station comprising a single antenna to perform handovers in MBB fashion with no need for re-pointing its antenna, wherein the earth station may be located anywhere within the combined coverage area of the kite-shaped tracking pattern circles of the satellite constellation (e.g., as previously described). The satellite constellation may be configured so that for each handover point (e.g., of the above mentioned handover points), two satellites associated with the two respective orbits corresponding to the handover point (e.g., one satellite per orbit) may pass at about the handover point at about a same time.

FIG. 5 shows a schematic example of kite-shaped tracking patterns that may be associated with the satellite constellation (e.g. as previously described in reference to FIG. 4). As illustrated in FIG. 5 and discussed in detail below, configuring the satellite constellation so that for each handover point two satellites associated with the two respective orbits corresponding to the handover point may pass at about the handover point at about a same time may be possible. It shall be appreciated that though the analysis herein may be provided for the northern hemisphere part of the satellite constellation, similar analysis may be applied in a symmetrical manner (and with similar results) to the southern hemisphere part of the satellite constellation.

Considering all handover points that may be at the eastern corners of the kite-shaped tracking patterns or at the western corners of the kite-shaped tracking patterns, e.g., points 504, 506, 507 and 508 of FIG. 5. At any particular handover point of these eastern corners or western corners handover points, the two orbits that may intersect at the particular handover point may be one orbit that may be associated with an inclination angle of β degrees and another orbit that may be associated with an inclination angle of about 180−β degrees. Therefore, any such particular handover point may be associated with identical sphere distances from the respective ascending nodes corresponding to the two orbits intersecting at the particular handover point. For example, handover point 504 may be an ascending node of both respective intersecting orbits. In another example, handover point 506 may be a descending node of both respective intersecting orbits, thus 180 degrees away from the two orbits' ascending node. In yet another example, handover points 507 and 508 may each be at an intersection of two sides of an equal-sided spherical triangle whose basis is on the equator. In particular, handover point 508 may be at a same spherical distance from the ascending node 504 of orbit 510 and from the ascending node 512 of orbit 511. Consequently, due to the satellite constellation being configured (e.g. as previously described) with a relative initial phasing of 0 degrees for the entire constellation, and being configured with a same number of satellites in each orbit, and equal distances between adjacent satellites associated with a same orbit, satellites of the two orbits associated with the particular handover point must arrive at the particular handover point at about the same time.

Considering now all handover points that may be at the northern corners of the kite-shaped tracking patterns of the first circle of kite-shaped tracking patterns, e.g. handover point A (503) in FIG. 5. The kite-shaped tracking pattern ACDB may comprise a northern triangle ABC (503, 504, 506), which may be a sphere triangle (e.g. a triangle on a sphere). The size of the basis of triangle ABC may be noted as a, wherein a may be calculated as a=360/18=20 degrees (as per the previous description of the satellite constellation). The sizes of the other two edges of triangle ABC, e.g., denoted as b and c, may be identical (e.g., since the base angles of triangle ABC may be identical, $\beta$). Using the cotangent rule for the sphere triangle ABC having equal sides b=c, and considering $\beta$=57.16 degrees as previously described for the satellite constellation:

$$\cot(b)=(1+\cos(a))*\cos(\beta)/\sin(a)=(1+\cos(20))*\cos(57.16)/\sin(20)=3.076$$

$$b=\text{arccot}(3.076)=18.012 \text{ degrees}$$

Furthermore, it may be noted that when satellite 501 may be passing at its ascending node B (504), satellite 502 may be at point 505. The distance of point 505 from point 503 may need to be identical to b and c, e.g., point 505 may need to be 2b away from the descending node 506 of satellite 502, or in other words, it may need to be 180−2b away from the ascending node of satellite 502 (not shown in FIG. 5). Thus, for satellite 501 and satellite 502 to arrive at about a same time at about handover point A (503), the satellite constellation may be configured so that 180−2b may equal to or may be close to an integer multiple of the inter-satellite distance, e.g., integer multiple of 360/25=14.4 degrees. Given the size of edge b, as calculated above:

180−2b=143.976 degrees 143.976/14.4=9.998≈10

Thus, 180−2b may be about a multiple of the inter-satellite distance, as needed in order for satellites 501 and 502 to arrive at about handover point A (503) at about the same time. The error, e.g. between the exact quotient and the multiple of the inter-satellite distance, may be in the excess of about 0.06 degrees, e.g., as viewed from Earth center. Correspondingly, the error may be less than about 0.5 degrees for a terrestrial antenna, located on the Earth surface, approximately 1000 km below the constellation (e.g., for a constellation having an altitude of 1000 km above sea level). In other words, an antenna of an earth station that may be pointed at about handover point A (503) may be able to "see" and enable communication via both satellite 501 and satellite 502 as satellites 501 and 502 pass at about handover point A (503).

It may be noted that the same consideration holds for all handover points that may be at the southern corners of the kite-shaped tracking patterns of the first circle of kite-shaped tracking patterns, e.g. handover point D in FIG. 5.

It may also be noted that the handover points that may be at the northern corners of the kite-shaped tracking patterns of the first circle of kite-shaped tracking patterns are the same handover points that may be at the southern corners of the kite-shaped tracking patterns of the northern second circle of kite-shaped tracking patterns.

Finally, considering all handover points that may be at the northern points of kite-shaped tracking patterns of the northern second circle, e.g., point A' (514) in FIG. 5 that may belongs to the kite-shaped tracking pattern comprising handover points 503, 508, 514, and 507. The previously described analysis may apply to the equal sided sphere triangle A'B'C', whose sides may be equal (A'B'=A'C') and whose basis B'C' may be 3*20=60 degrees in size. Using again the cotangent rule, the side A'C', denoted b', may be calculated by:

$$\cot(b')=(1+\cos(60))*\cos(57.16)/\sin(60)=0.939$$

$$b'=\text{arccot}(0.939)=46.793 \text{ degrees}$$

Therefore, following similar logic as in the previously described analysis, the satellite constellation may be configured so that 180−2b' may equal to or may be close to an integer multiple of the inter-satellite distance, e.g., integer multiple of 360/25=14.4 degrees:

$$180-2b'=86.413 \text{ degrees}$$

$$86.413/14.4 \approx 6.001 \ 6$$

Thus, 180−2b' may be about a multiple of the inter-satellite distance, as needed in order for satellites flying in orbits 511 and 513 to arrive at about handover point A' (514) at about the same time.

The satellite constellation described above may be configured to support handovers without antenna re-pointing for any altitude of the satellites, provided high enough altitude for enabling line-of-sight between earth stations and the satellites. For example, at an altitude of about 1300 km, all earth stations that may be located at latitudes between −50 and 50 degrees may be supported, e.g., with an elevation angle of about 5 degrees or higher.

FIG. 6 shows a second schematic example of a satellite constellation (e.g., such as the NGSO satellite constellation of FIG. 2) in accordance with aspects of the disclosure. The satellite constellation may be depicted as it may be viewed from above the Earth's North Pole (denoted as N) and, for illustrative reasons only, as if it has zero altitude, e.g. a view similar to the one used in FIG. 4. As the satellite constellation shown in FIG. 4, the satellite constellation in FIG. 6 may also support handovers without antenna re-pointing, e.g., as previously described.

Further referring to FIG. 6, in some embodiments the second satellite constellation may comprise eight orbits (n=8) and six satellites (s=6) per orbit. In some embodiments, all orbits may be of a same altitude above the earth surface. In some embodiments, the number of orbits in the satellite constellation may be an integer multiple of 8 and/or the number of satellites per orbit may be an integer multiple of 6. FIG. 6 may show three (3) satellites per each orbit, for example satellites 603*a*, 603*b*, and 603*c* of orbit 604, wherein the other three satellites of each orbit may not be visible from the point of view of FIG. 6, e.g., due to being on the other side of the Earth (over the southern hemisphere). Each orbit of the eight orbits may be associated with a distinct ascending node, wherein the eight ascending nodes corresponding to the eight orbits may be equally spaced around the equator, e.g., 45 degrees apart of each other (as 360/8=45). Any two orbits having adjacent ascending nodes (e.g. about 45 degrees away of each other) may be associated with about 180 degrees complimenting inclination angles. For example, orbit 601 (having an ascending node at about 180 degrees) and orbit 602 (having an adjacent ascending node at about 225 degrees) may be associated with about 180 degrees complimenting inclination angles. In some embodiments, orbit 601 may have an inclination angle of about 54.736 degrees and orbit 602 may have an inclination angle of about 125.264 degrees (as 180−54.736=125.264). In addition, the second satellite constellation may be configured with a same initial phasing (e.g. 0 degrees), e.g., the second satellite constellation may be configured to have a satellite from each of the eight orbits at the respective ascending nodes of the orbits at about a same time. In some embodiments, the second satellite constellation may feature two first-circles of kite-shaped tracking patterns configured to support continuous-tracking with no need for re-pointing (e.g. as previously described in reference to FIG. 3), a northern first circle (e.g., over the northern hemisphere) and a southern first circle (e.g., over the southern hemisphere). The northern first circle and the southern first circle may be symmetric (e.g., relative to the equatorial plane). The northern first circle of kite-shaped tracking patterns may entirely reside north of the equator, e.g. touching the equatorial plane. Using the notation format previously described (e.g., (Longitude, Latitude) for regular handover points and (Longitude, Latitude)* for handover points in which no handover may occur upon switching to a next kite-shaped tracking pattern), the handover points for the northern first circle of kite-shaped tracking patterns may be located at about (90L, 0), (90L+22.5,28.4)*, (90L,45), and (90L−22.5,28.4) for anti-clock-wise tracked kite-shaped tracking patterns, and (90L+45,0), (90L+22.5,28.4), (90L+45,45), and (90L+67.5, 28.4)* for clock-wise tracked kite-shaped tracking patterns, wherein L may equal 0, 1, 2, and/or 3. For example, for L=3, the clock-wise tracked kite-shaped tracking pattern 605 may include handover points at about (315,0), (297.5,28.4), (315, 45), and (337.5,28.4)*.

In some embodiments, the second satellite constellation may further feature two second-circles of triangle-shaped tracking patterns, a northern second circle and a southern second circle. The northern second circle of triangle-shaped tracking patterns may be north of the northern first circle of kite-shaped tracking patterns, e.g., over the northern hemisphere, and the southern second circle of triangle-shaped tracking patterns may be south of the southern first circle of kite-shaped tracking patterns, e.g., over the southern hemisphere. The northern second circle and the southern second circle may be symmetric (e.g., relative to the equator). Handover points for the northern second circle of triangle-shaped tracking patterns may be at about (90L, 45), (90L−22.5,53), and (90L+22.5,53)* for clock-wise tracked triangle-shaped tracking patterns, and (90L+45,45), (90L+ 67.5,53)*, and (90L+22.5,53) for anti-clock-wise tracked triangle-shaped tracking patterns, wherein L may equal 0, 1, 2 and/or 3. For example, for L=3, the anti-clock-wise tracked triangle-shaped tracking pattern 606 may include handover points (315,45), (337.5,53), and (292.5,53).

As previously mentioned, FIG. 6, shows three satellites for each orbit (e.g. orbit 604). A first satellite of the three satellites (e.g. satellite 603*a*) may be shown approaching the descending node of orbit 604, where it may stop serving earth stations located in the northern hemisphere and tracking kite-shaped tracking patterns associated with the northern hemisphere, and start serving earth stations located in the southern hemisphere and tracking kite-shaped tracking pattern associated with the southern hemisphere. A second satellite of the three satellites (e.g. satellite 603*b*) may be shown approaching a handover point, where it may stop serving earth stations tracking a triangle-shaped tracking pattern and start serving earth stations tracking a kite-shaped tracking pattern. A third satellite of the three satellites (e.g. satellite 603*c*) may be shown approaching another handover point, where it may stop serving earth stations tracking a kite-shaped tracking pattern and start serving earth stations tracking a triangle-shaped tracking pattern.

The second satellite constellation may be configured to enable an earth station comprising a single antenna to perform handovers in MBB fashion with no need for re-pointing its antenna, wherein the earth station may be located anywhere within the combined coverage area of the first and second circles of tracking patterns (e.g., as previously described). The second satellite constellation may be configured so that for each handover point (e.g., of the above mentioned handover points), two satellites associated with the two respective orbits corresponding to the handover point (e.g., one satellite per orbit) may pass at about the handover point at about a same time. The following paragraphs may show that so configuring the satellite constellation may be possible. It shall be appreciated that though the analysis herein may be provided for the northern hemisphere part of the satellite constellation, similar analysis may be applied in a symmetrical manner (and with similar results) to the southern hemisphere part of the satellite constellation.

FIG. 7 shows a satellite-tracking pattern. Considering initially the handover points at about the equatorial plane (e.g. between the northern first circle and the southern first circle), for example point 701 in FIG. 7 and in FIG. 6. As previously mentioned, the second satellite constellation may be configured with relative initial phasing of 0 degrees for all orbits and with an even number of satellites per orbit (e.g. 6 satellites per orbit). Consequently, satellites of the two orbits associated with the particular handover point must arrive at the particular handover point, which may be the ascending node for one satellite and the descending node for the other satellite, at about the same time.

Considering now all handover points that may be at the eastern corners and/or at the western corners of the kite-shaped and/or the triangle-shaped tracking patterns, for example points 702, 703, 704, and 705 in FIG. 7 and in FIG. 6. At any particular handover point of these eastern corners or western corners handover points, the two orbits that may intersect at the particular handover point may comprise one orbit that may be associated with an inclination angle of β degrees and another orbit associated with an inclination angle of about 180−β degrees. Therefore, any such particular handover point may be associated with identical sphere distances from the respective ascending nodes corresponding to the two orbits intersecting at the particular handover point. For example, handover point 703 may be equally distant from the two ascending nodes of the corresponding intersecting orbits (e.g. due to being at the head point of an equal-sided triangle). In another example, handover point 702 may be equally distant from the two ascending nodes of the corresponding intersecting orbits since it may be equally distant from the two descending nodes of the corresponding intersecting orbits (e.g., relying again on properties of an equal-sided triangle). Yet in a further example and in reference to FIG. 6, each handover point of handover points 704 and 705 may be at the head of an equal-sided triangle whose basis may be at the equatorial, and whose equal edges being parts of the corresponding intersecting orbits (e.g., the parts between the equatorial and the intersecting point). Consequently, and due the second satellite constellation being configured with relative initial phasing of 0 degrees for the entire constellation (e.g. as previously described), satellites of the two orbits associated with the particular handover point must arrive at the particular handover point at about the same time.

Finally, considering the handover points that may be at the northern corner of a kite-shaped tacking pattern (which may be also the southern corner of a triangle-shaped tracking pattern), for example point A (706) as shown in FIG. 7. The sphere trigonometry analysis previously described may be used in this case as well, wherein in this case the equal-sided triangle may have a basis (e.g. BC in FIG. 7) of 90 degrees in size. Thus, the size of the other two equal edges (e.g., AB and AC in FIG. 7), denoted b", may be calculated using the cotangent rule:

$$\cot(b'')=(1+\cos(90))*\cos(54.736)/\sin(90)=0.577$$

$$b''=\text{arccot}(0.577)=60 \text{ degrees}$$

Therefore, following similar logic as previously described, the satellite constellation may be configured so that 180−2b" may equal to or may be close to an integer multiple of the inter-satellite distance, e.g., integer multiple of 360/6=60 degrees:

$$180-2b''=60 \text{ degrees}$$

$$60/60=1$$

Thus, 180−2b" may be about a multiple of the inter-satellite distance, as needed in order for satellites to arrive at about the particular handover points at about the same time.

In some embodiments, earth stations located between latitudes 0 and 45 degrees may track the kite-shaped tracking patterns, and earth stations located at higher latitudes may track the triangle-shaped tracking patterns. In some embodiments, e.g. for at least a purpose of supporting handovers without antenna re-pointing, the satellites of the second satellite constellation may be placed at relatively high altitudes (e.g., Medium Earth Orbit, MEO). For example, positioning the second satellite constellation at an altitude of about 7500 kilometers may allow earth stations that may be located at about the equator to follow (one of) the first circles of kite-shaped tracking patterns using antenna elevations of 12 degrees or more. At such constellation altitude (e.g. of about 7500 kilometers), earth stations that may be located at high latitudes, e.g., between ±45 degrees and ±90 degrees (e.g., the Earth's poles), may follow the second circles of triangle-shaped tracking patterns using elevation angles even higher than 12 degrees. In some embodiments, earth stations that may be located at latitudes slightly lower than ±45 degrees may also track the second circles of triangle-shaped tracking patterns, for at least the purpose of improving load balancing between the satellites (e.g., due to a given population distribution or a given traffic demand distribution over the Earth).

During a handover from a first satellite to a second satellite (e.g., in accordance with any of the back-and-forth, kite-shaped, or triangle-shaped tracking patterns, and/or in accordance with any of the satellite constellations and/or satellite constellation types previously presented), both the first satellite and the second satellite may appear to be inside the main lobe of the earth station antenna. In some embodiments, the earth station may comprise at least two receiving chains (e.g., each with its Low Noise Block (LNB)), for at least the purpose of locking on a forward link carrier that may be transmitted over the second satellite while remaining tuned to and/or receiving a forward link carrier that may be transmitted over the first satellite. The earth station may also comprise at least two transmitters (e.g. each coupled to a separate Block Up-Converter (BUC)), for at least the purpose of supporting the performing of a handover in an MBB fashion, using the single earth station antenna. In some embodiments, the earth station may comprise only a single transmitter (and a single BUC, e.g., in order to reduce the earth station cost), and may be configured to use a time division multiple access (TDMA) scheme for transmitting towards both the first satellite and the second satellite (e.g. on different frequencies). In both embodiments, the earth station may be configured to perform a handover from the first satellite to the second satellite in an MBB fashion. The earth station may be configured to transmit data over the first satellite while establishing a return link over the second satellite, determine that a return link over the second satellite is established, transfer the transmission of data to the return link established over the second satellite, and terminate the return link over the first satellite.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

We claim:

1. A satellite communication earth station comprising a single antenna, the satellite communication earth station configured to track satellites of a satellite constellation using the single antenna, wherein tracking the satellites of the satellite constellation comprises:
  tracking a first satellite associated with a first orbit along a first section of the first orbit;
  determining that the first satellite is at about a first handover point associated with the first orbit and with a second orbit;
  switching communication from the first satellite to a second satellite associated with the second orbit, wherein:
    the second satellite and the first satellite are at about the first handover point associated with the first orbit and the second orbit at about a same time, and
    the switching communication from the first satellite to the second satellite is in accordance with a make-before-break technique;
  tracking the second satellite along a second section of the second orbit, wherein the first section and the second section are part of a first tracking pattern;
  performing one or more tracking cycles along the first tracking pattern;
  determining a need to switch the tracking of the satellites to a second tracking pattern located to the east of the first tracking pattern, wherein the first tracking pattern and the second tracking pattern have a common handover point; and
  switching the tracking of the satellites from the first tracking pattern to the second tracking pattern by tracking a satellite in accordance to the first tracking pattern past the common handover point into the second tracking pattern, without switching communication at about the common handover point.

2. The satellite communication earth station of claim 1, wherein tracking the satellites of the satellite constellation further comprises:
  determining that the second satellite is at about a second handover point associated with the second orbit and with a third orbit;
  switching communication from the second satellite to a third satellite associated with the third orbit;
  tracking the third satellite along a third section of the third orbit;
  determining that the third satellite is at about a third handover point associated with the third orbit and with a fourth orbit;
  switching communication from the third satellite to a fourth satellite associated with the fourth orbit;
  tracking the fourth satellite along a fourth section of the fourth orbit;
  determining that the fourth satellite is at about a fourth handover point associated with the fourth orbit and with the first orbit; and
  switching communication from the fourth satellite to another satellite associated with the first orbit, the another satellite is different from the first satellite.

3. The satellite communication earth station of claim 2, wherein the third section and the fourth section are part of the first tracking pattern.

4. The satellite communication earth station of claim 1, wherein tracking the satellites of the satellite constellation further comprises:
  determining that the second satellite is at about a second handover point associated with the second orbit and with a third orbit;
  switching communication from the second satellite to a third satellite associated with the third orbit;
  tracking the third satellite along a section of the third orbit;
  determining that the third satellite is at about a third handover point associated with the third orbit and with the first orbit; and
  switching communication from the third satellite to another satellite associated with the first orbit, the another satellite is different from the first satellite.

5. The satellite communication earth station of claim 1, where the make-before-break technique comprises establishing a second return link over the second satellite prior to terminating a first return link over the first satellite.

6. The satellite communication earth station of claim 3, wherein a tracking direction of the first tracking pattern is opposite to a tracking direction of the second tracking pattern.

7. A method of tracking satellites of a satellite constellation using a single antenna of a satellite communication earth station, the method comprising:
  tracking, by the satellite communication earth station, a first satellite associated with a first orbit along a first section of the first orbit;
  determining, by the satellite communication earth station, that the first satellite is at about a first handover point associated with the first orbit and with a second orbit;
  switching, by the satellite communication earth station, communication from the first satellite to a second satellite associated with the second orbit, wherein:
    the second satellite and the first satellite are at about the first handover point associated with the first orbit and the second orbit at about a same time, and
    the switching communication from the first satellite to the second satellite is in accordance with a make-before-break technique;
  tracking, by the satellite communication earth station, the second satellite along a second section of the second orbit, wherein the first section and the second section are part of a first tracking pattern;
  performing one or more tracking cycles along the first tracking pattern;
  determining a need to switch the tracking of the satellites to a second tracking pattern located to the east of the first tracking pattern, wherein the first tracking pattern and the second tracking pattern have a common handover point; and
  switching the tracking of the satellites from the first tracking pattern to the second tracking pattern by tracking a satellite in accordance to the first tracking pattern past the common handover point into the second tracking pattern, without switching communication at about the common handover point.

8. The method of claim 7, further comprising:
  determining that the second satellite is at about a second handover point associated with the second orbit and with a third orbit;
  switching communication from the second satellite to a third satellite associated with the third orbit;
  tracking the third satellite along a third section of the third orbit;
  determining that the third satellite is at about a third handover point associated with the third orbit and with a fourth orbit;
  switching communication from the third satellite to a fourth satellite associated with the fourth orbit;
  tracking the fourth satellite along a fourth section of the fourth orbit;

determining that the fourth satellite is at about a fourth handover point associated with the fourth orbit and with the first orbit; and switching communication from the fourth satellite to another satellite associated with the first orbit, the another satellite is different from the first satellite.

9. The method of claim 8, wherein the third section and the fourth section are part of the first tracking pattern.

10. The method of claim 7, further comprising:
determining that the second satellite is at about a second handover point associated with the second orbit and with a third orbit;
switching communication from the second satellite to a third satellite associated with the third orbit;
tracking the third satellite along a section of the third orbit;
determining that the third satellite is at about a third handover point associated with the third orbit and with the first orbit; and
switching communication from the third satellite to another satellite associated with the first orbit, the another satellite is different from the first satellite.

11. The method of claim 7, where the make-before-break technique comprises establishing a second return link over the second satellite prior to terminating a first return link over the first satellite.

12. The method of claim 9, wherein a tracking direction of the first tracking pattern is opposite to a tracking direction of the second tracking pattern.

13. A system comprising:
a satellite constellation comprising one or more satellites;
a satellite communication earth station comprising a single antenna, wherein the satellite communication earth station is configured to:
track a first satellite, of the one or more satellites, wherein the first satellite is associated with a first orbit along a first section of the first orbit;
determine that the first satellite is at about a first handover point associated with the first orbit and with a second orbit;
switch communication from the first satellite to a second satellite, of the one or more satellites, wherein the second satellite is associated with the second orbit, wherein:
the second satellite and the first satellite are at about the first handover point associated with the first orbit and the second orbit at about a same time, and
the switching communication from the first satellite to the second satellite is in accordance with a make-before-break technique;
track the second satellite along a second section of the second orbit, wherein the first section and the second section are part of a first tracking pattern;
perform one or more tracking cycles along the first tracking pattern;

determine a need to switch the tracking of the satellites to a second tracking pattern located to the east of the first tracking pattern, wherein the first tracking pattern and the second tracking pattern have a common handover point; and
switch the tracking of the satellites from the first tracking pattern to the second tracking pattern by tracking a satellite in accordance to the first tracking pattern past the common handover point into the second tracking pattern, without switching communication at about the common handover point.

14. The system of claim 13, wherein the satellite communication earth station is configured to:
determine that the second satellite is at about a second handover point associated with the second orbit and with a third orbit;
switch communication from the second satellite to a third satellite associated with the third orbit;
track the third satellite along a third section of the third orbit;
determine that the third satellite is at about a third handover point associated with the third orbit and with a fourth orbit;
switch communication from the third satellite to a fourth satellite associated with the fourth orbit;
track the fourth satellite along a fourth section of the fourth orbit;
determine that the fourth satellite is at about a fourth handover point associated with the fourth orbit and with the first orbit; and
switch communication from the fourth satellite to another satellite associated with the first orbit, the another satellite is different from the first satellite.

15. The system of claim 14, wherein the third section and the fourth section are part of the first tracking pattern.

16. The system of claim 13, wherein the satellite communication earth station is configured to:
determine that the second satellite is at about a second handover point associated with the second orbit and with a third orbit;
switch communication from the second satellite to a third satellite associated with the third orbit;
track the third satellite along a section of the third orbit;
determine that the third satellite is at about a third handover point associated with the third orbit and with the first orbit; and
switch communication from the third satellite to another satellite associated with the first orbit, the another satellite is different from the first satellite.

17. The system of claim 13, where the make-before-break technique comprises establishing a second return link over the second satellite prior to terminating a first return link over the first satellite.

18. The system of claim 15, wherein a tracking direction of the first tracking pattern is opposite to a tracking direction of the second tracking pattern.

* * * * *